United States Patent
Matz et al.

(10) Patent No.: US 10,674,227 B2
(45) Date of Patent: *Jun. 2, 2020

(54) STREAMING VIDEO

(71) Applicant: AT&T Intellectual Property I, L.P., Atlanta, GA (US)

(72) Inventors: William R. Matz, Atlanta, GA (US); Scott R. Swix, Rockford, MI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,797

(22) Filed: Apr. 6, 2018

(65) Prior Publication Data

US 2018/0227645 A1 Aug. 9, 2018

Related U.S. Application Data

(63) Continuation of application No. 10/017,742, filed on Dec. 14, 2001, now Pat. No. 9,967,633.

(51) Int. Cl.
*H04N 21/81* (2011.01)
*H04N 21/658* (2011.01)
(Continued)

(52) U.S. Cl.
CPC ........ *H04N 21/6582* (2013.01); *H04H 60/33* (2013.01); *H04H 60/43* (2013.01);
(Continued)

(58) Field of Classification Search
None
See application file for complete search history.

(56) References Cited

U.S. PATENT DOCUMENTS

| 3,798,610 A | 3/1974 | Bliss et al. |
| 3,886,302 A | 5/1975 | Kosco |

(Continued)

FOREIGN PATENT DOCUMENTS

| EP | 0 424 648 | 2/1991 |
| EP | 1 162 840 | 12/2001 |

(Continued)

OTHER PUBLICATIONS

U.S. Appl. No. 95/000,601, Grauch.

(Continued)

*Primary Examiner* — Cai Y Chen
(74) *Attorney, Agent, or Firm* — Scott P. Zimmerman, PLLC

(57) ABSTRACT

Systems and methods for effectively and efficiently receiving, analyzing, and using subscriber content choice information are described. One embodiment of the present invention includes a subscriber-action database, such as a clickstream database, a media-content database, and a merge processor electronically connected to the two databases for merging data in the subscriber-action database with data in the media-content database to create a subscriber content-choice database. The media-content database may include programming and/or advertising data. The media-content database may also include category and context information to provide the capability to comprehensively analyze data in the subscriber content-choice database.

20 Claims, 5 Drawing Sheets

(51) Int. Cl.

| | | |
|---|---|---|
| *H04H 60/63* | (2008.01) | |
| *H04H 60/43* | (2008.01) | |
| *H04N 21/258* | (2011.01) | |
| *H04N 21/24* | (2011.01) | |
| *H04N 7/173* | (2011.01) | |
| *H04H 60/66* | (2008.01) | |
| *H04N 21/442* | (2011.01) | |
| *H04H 60/33* | (2008.01) | |
| *H04N 21/2668* | (2011.01) | |

(52) U.S. Cl.
CPC ............ *H04H 60/63* (2013.01); *H04H 60/66* (2013.01); *H04N 7/17318* (2013.01); *H04N 21/2408* (2013.01); *H04N 21/25891* (2013.01); *H04N 21/2668* (2013.01); *H04N 21/44222* (2013.01); *H04N 21/812* (2013.01)

(56) References Cited

U.S. PATENT DOCUMENTS

| | | | |
|---|---|---|---|
| 3,924,187 | A | 12/1975 | Dormans |
| 4,130,833 | A | 12/1978 | Chomet |
| 4,258,386 | A | 3/1981 | Cheung |
| 4,361,851 | A | 11/1982 | Asip et al. |
| 4,488,179 | A | 12/1984 | Kruger et al. |
| 4,566,030 | A | 1/1986 | Nickerson et al. |
| 4,567,591 | A | 1/1986 | Gray et al. |
| 4,598,288 | A | 7/1986 | Yarbrough et al. |
| 4,602,279 | A | 7/1986 | Freeman |
| 4,688,248 | A | 8/1987 | Tomizawa |
| 4,689,661 | A | 8/1987 | Barbieri et al. |
| 4,697,209 | A | 9/1987 | Kiewit et al. |
| 4,698,670 | A | 10/1987 | Matty |
| 4,720,873 | A | 1/1988 | Goodman et al. |
| 4,816,904 | A | 3/1989 | McKenna et al. |
| 4,885,632 | A | 12/1989 | Mabey et al. |
| 4,890,322 | A | 12/1989 | Russell, Jr. |
| 4,912,552 | A | 3/1990 | Allison |
| 5,010,585 | A | 4/1991 | Garcia |
| 5,038,211 | A | 8/1991 | Hallenbeck |
| 5,046,090 | A | 9/1991 | Walker et al. |
| 5,046,092 | A | 9/1991 | Walker et al. |
| 5,055,924 | A | 10/1991 | Skutta |
| 5,173,900 | A | 12/1992 | Miller et al. |
| 5,191,645 | A | 3/1993 | Carlucci et al. |
| 5,208,665 | A | 5/1993 | McCalley et al. |
| 5,247,347 | A | 9/1993 | Litteral et al. |
| 5,249,044 | A | 9/1993 | VonKohorn |
| 5,251,324 | A | 10/1993 | McMullan, Jr. |
| 5,287,181 | A | 2/1994 | Holman |
| 5,335,277 | A | 8/1994 | Harvey et al. |
| 5,339,315 | A | 8/1994 | Maeda et al. |
| 5,343,240 | A | 8/1994 | Yu |
| 5,357,276 | A | 10/1994 | Banker et al. |
| 5,374,951 | A | 12/1994 | Welsh |
| 5,382,970 | A | 1/1995 | Kiefl |
| 5,389,964 | A | 2/1995 | Oberle |
| 5,404,393 | A | 4/1995 | Remillard |
| 5,410,326 | A | 4/1995 | Goldstein |
| 5,410,344 | A | 4/1995 | Graves |
| 5,436,653 | A | 7/1995 | Ellis et al. |
| 5,440,334 | A | 8/1995 | Walters et al. |
| 5,444,499 | A | 8/1995 | Saitoh |
| 5,446,490 | A | 8/1995 | Blahut et al. |
| 5,446,919 | A | 8/1995 | Wilkins |
| 5,481,294 | A | 1/1996 | Thomas et al. |
| 5,495,282 | A | 2/1996 | Mostafa |
| 5,497,185 | A | 3/1996 | Dufresne et al. |
| 5,500,681 | A | 3/1996 | Jones |
| 5,504,519 | A | 4/1996 | Remillard |
| 5,532,732 | A | 7/1996 | Yuen et al. |
| 5,532,735 | A | 7/1996 | Blahut et al. |
| 5,534,911 | A | 7/1996 | Levitan |
| 5,537,143 | A | 7/1996 | Steingold et al. |
| 5,559,548 | A | 9/1996 | Davis |
| 5,579,124 | A | 11/1996 | Aijala et al. |
| 5,585,838 | A | 12/1996 | Lawler et al. |
| 5,585,865 | A | 12/1996 | Amano |
| 5,589,892 | A | 12/1996 | Knee et al. |
| 5,596,994 | A | 1/1997 | Bro |
| 5,600,364 | A | 2/1997 | Hendricks |
| 5,600,366 | A | 2/1997 | Schulman |
| 5,606,359 | A | 2/1997 | Youden et al. |
| 5,606,602 | A | 2/1997 | Johnson et al. |
| 5,608,448 | A | 3/1997 | Smoral et al. |
| 5,619,247 | A | 4/1997 | Russo |
| 5,630,119 | A | 5/1997 | Aristides |
| 5,649,200 | A | 7/1997 | Leblang et al. |
| 5,659,350 | A | 8/1997 | Hendricks |
| 5,661,516 | A | 8/1997 | Carles |
| 5,710,815 | A | 1/1998 | Ming et al. |
| 5,721,827 | A | 2/1998 | Logan |
| 5,724,521 | A | 3/1998 | Dedrick |
| 5,724,525 | A | 3/1998 | Beyers, II et al. |
| 5,724,607 | A | 3/1998 | Brandt |
| 5,740,549 | A | 4/1998 | Reilly et al. |
| 5,752,159 | A | 5/1998 | Faust et al. |
| 5,754,775 | A | 5/1998 | Adamson et al. |
| 5,754,939 | A | 5/1998 | Herz |
| 5,758,257 | A | 5/1998 | Herz |
| 5,758,259 | A | 5/1998 | Lawler |
| 5,774,170 | A | 6/1998 | Hite et al. |
| 5,777,614 | A | 7/1998 | Ando et al. |
| 5,778,182 | A | 7/1998 | Cathey et al. |
| 5,794,210 | A | 8/1998 | Goldhaber et al. |
| 5,796,952 | A | 8/1998 | Davis et al. |
| 5,798,785 | A | 8/1998 | Hendricks et al. |
| 5,809,481 | A | 9/1998 | Baron et al. |
| 5,818,438 | A | 10/1998 | Howe |
| 5,838,314 | A | 11/1998 | Neel |
| 5,848,396 | A | 12/1998 | Gerace |
| 5,848,397 | A | 12/1998 | Marsh et al. |
| 5,850,249 | A | 12/1998 | Massetti et al. |
| 5,850,447 | A | 12/1998 | Peyret |
| 5,854,897 | A | 12/1998 | Radziewicz et al. |
| 5,861,906 | A | 1/1999 | Dunn |
| 5,867,226 | A | 2/1999 | Wehmeyer et al. |
| 5,872,588 | A | 2/1999 | Aras et al. |
| 5,872,834 | A | 2/1999 | Teitelbaum et al. |
| 5,883,942 | A | 3/1999 | Lim et al. |
| 5,892,508 | A | 4/1999 | Howe |
| 5,892,536 | A | 4/1999 | Logan |
| 5,900,908 | A | 5/1999 | Kirkland |
| 5,901,209 | A | 5/1999 | Tannhenbaum et al. |
| 5,917,481 | A | 6/1999 | Rzeszewski |
| 5,931,908 | A | 8/1999 | Gerba et al. |
| 5,945,988 | A | 8/1999 | Williams et al. |
| 5,946,636 | A | 8/1999 | Uyeno et al. |
| 5,948,061 | A | 9/1999 | Merriman et al. |
| 5,973,683 | A | 10/1999 | Cragun |
| 5,983,227 | A | 11/1999 | Nazem |
| 5,991,735 | A | 11/1999 | Gerace |
| 5,991,799 | A | 11/1999 | Yen et al. |
| 6,002,393 | A | 12/1999 | Hite |
| 6,005,597 | A | 12/1999 | Barrett |
| 6,006,218 | A | 12/1999 | Breese et al. |
| 6,015,344 | A | 1/2000 | Kelly et al. |
| 6,026,368 | A | 2/2000 | Brown et al. |
| 6,029,045 | A | 2/2000 | Picco et al. |
| 6,029,195 | A | 2/2000 | Herz |
| 6,064,980 | A | 5/2000 | Jacobi et al. |
| 6,076,094 | A | 6/2000 | Cohen |
| 6,081,840 | A | 6/2000 | Zhao |
| 6,100,916 | A | 8/2000 | August |
| 6,119,098 | A | 9/2000 | Guyot et al. |
| 6,128,009 | A | 10/2000 | Ohkura et al. |
| 6,134,531 | A | 10/2000 | Trewitt et al. |
| 6,134,532 | A | 10/2000 | Lazarus |
| 6,160,570 | A | 12/2000 | Sitnik |
| 6,163,644 | A | 12/2000 | Owashi et al. |
| 6,172,674 | B1 | 1/2001 | Etheredge |
| 6,172,677 | B1 | 1/2001 | Stautner et al. |
| 6,177,931 | B1 | 1/2001 | Alexander et al. |

(56) References Cited

U.S. PATENT DOCUMENTS

| | | |
|---|---|---|
| D437,879 S | 2/2001 | Weinandt |
| 6,185,614 B1 | 2/2001 | Cuomo |
| 6,199,076 B1 | 3/2001 | Logan et al. |
| 6,202,210 B1 | 3/2001 | Judtke |
| 6,226,618 B1 | 5/2001 | Downs et al. |
| 6,236,975 B1 | 5/2001 | Boe et al. |
| 6,252,586 B1 | 6/2001 | Freeman et al. |
| 6,253,189 B1 | 6/2001 | Feezell et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,292,549 B1 | 9/2001 | Lung et al. |
| 6,304,644 B2 | 10/2001 | Karnowski |
| 6,310,943 B1 | 10/2001 | Kowalski |
| 6,314,568 B1 | 11/2001 | Ochiai |
| 6,314,577 B1 | 11/2001 | Pocock |
| 6,317,488 B1 | 11/2001 | DePond et al. |
| 6,324,271 B1 | 11/2001 | Sawyer et al. |
| 6,327,574 B1 | 12/2001 | Kramer et al. |
| 6,332,021 B2 | 12/2001 | Latter et al. |
| 6,338,043 B1 | 1/2002 | Miller |
| 6,339,639 B1 | 1/2002 | Henderson |
| 6,341,161 B1 | 1/2002 | Latter et al. |
| 6,345,187 B1 | 2/2002 | Berthoud et al. |
| 6,345,256 B1 | 2/2002 | Milsted et al. |
| 6,351,637 B1 | 2/2002 | Lee |
| 6,353,444 B1 | 3/2002 | Katta et al. |
| 6,353,929 B1 | 3/2002 | Houston |
| 6,366,772 B1 | 4/2002 | Arnson |
| 6,397,057 B1 | 5/2002 | Malackowski et al. |
| 6,400,408 B1 | 6/2002 | Berger |
| 6,408,437 B1 | 6/2002 | Hendricks et al. |
| 6,427,003 B1 | 7/2002 | Corbett |
| 6,434,747 B1 | 8/2002 | Khoo et al. |
| 6,438,216 B1 | 8/2002 | Aktas |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,446,261 B1 | 9/2002 | Rosser |
| 6,457,010 B1 | 9/2002 | Eldering |
| 6,463,468 B1 | 10/2002 | Bush |
| 6,463,585 B1 | 10/2002 | Hendricks et al. |
| 6,477,704 B1 | 11/2002 | Cremia |
| 6,480,589 B1 | 11/2002 | Lee et al. |
| 6,487,538 B1 | 11/2002 | Gupta et al. |
| 6,493,439 B2 | 12/2002 | Lung et al. |
| 6,496,569 B2 | 12/2002 | Pelletier et al. |
| 6,496,571 B1 | 12/2002 | Wilson |
| 6,496,818 B1 | 12/2002 | Ponte |
| 6,498,841 B2 | 12/2002 | Bull et al. |
| 6,505,348 B1 | 1/2003 | Knowles |
| 6,507,839 B1 | 1/2003 | Ponte |
| 6,510,417 B1 | 1/2003 | Woods |
| 6,529,591 B1 | 3/2003 | Dosani et al. |
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 | 4/2003 | Abecassis |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,701,362 B1 | 3/2004 | Subramonian |
| 6,714,992 B1 | 3/2004 | Kanojia et al. |
| 6,718,021 B2 | 4/2004 | Crockett et al. |
| 6,718,551 B1 | 4/2004 | Swix et al. |
| 6,728,355 B2 | 4/2004 | Kowalski |
| 6,731,727 B2 | 5/2004 | Corbett et al. |
| 6,738,978 B1 | 5/2004 | Hendricks et al. |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 | 7/2004 | Matheny et al. |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,839,680 B1 | 1/2005 | Liu et al. |
| 6,845,151 B2 | 1/2005 | Peng |
| 6,845,396 B1 | 1/2005 | Kanojia |
| 6,845,398 B1 | 1/2005 | Galensky |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch et al. |
| 6,985,188 B1 | 1/2006 | Hurst, Jr. |
| 6,985,882 B1 | 1/2006 | Del Sesto |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,100,183 B2 | 8/2006 | Kunkel et al. |
| 7,212,979 B1 | 5/2007 | Matz et al. |
| 7,228,283 B1 | 6/2007 | Hornstein |
| 7,260,823 B2 * | 8/2007 | Schlack ............... G06Q 30/02 348/E7.071 |
| 7,269,835 B2 | 9/2007 | Swix |
| 7,343,354 B2 | 3/2008 | Hennessey |
| 7,386,547 B2 | 6/2008 | Grasso et al. |
| 7,440,943 B2 | 10/2008 | Grasso et al. |
| 7,441,260 B1 | 10/2008 | Kurapati |
| 7,444,658 B1 | 10/2008 | Matz |
| 7,526,458 B2 | 4/2009 | Flinn et al. |
| 7,584,490 B1 | 9/2009 | Schlack |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 7,970,863 B1 | 6/2011 | Fontaine |
| 7,979,877 B2 | 7/2011 | Huber et al. |
| 8,069,461 B2 | 11/2011 | Angiolillo et al. |
| 8,196,166 B2 | 6/2012 | Roberts et al. |
| 8,200,525 B2 | 6/2012 | Kilger |
| 8,677,384 B2 | 3/2014 | Gray et al. |
| 2001/0004733 A1 | 6/2001 | Eldering |
| 2002/0002488 A1 | 1/2002 | Muyres et al. |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0019858 A1 | 2/2002 | Kaiser |
| 2002/0032906 A1 | 3/2002 | Grossman |
| 2002/0035600 A1 | 3/2002 | Ullman et al. |
| 2002/0038455 A1 | 3/2002 | Srinivasan et al. |
| 2002/0046099 A1 | 4/2002 | Frengut et al. |
| 2002/0049631 A1 | 4/2002 | Williams |
| 2002/0049967 A1 | 4/2002 | Haseltine et al. |

(56) References Cited

U.S. PATENT DOCUMENTS

| | | |
|---|---|---|
| 2002/0056109 A1 | 5/2002 | Tomsen |
| 2002/0056118 A1 | 5/2002 | Hunter et al. |
| 2002/0062247 A1 | 5/2002 | Allen |
| 2002/0078443 A1 | 6/2002 | Gadkari et al. |
| 2002/0083441 A1 | 6/2002 | Flickinger et al. |
| 2002/0087573 A1 | 7/2002 | Reuning et al. |
| 2002/0090933 A1 | 7/2002 | Rouse et al. |
| 2002/0092017 A1 | 7/2002 | Klosterman et al. |
| 2002/0092019 A1 | 7/2002 | Marcus |
| 2002/0099591 A1 | 7/2002 | Dyer |
| 2002/0100064 A1 | 7/2002 | Ward et al. |
| 2002/0116476 A1 | 8/2002 | Eyal |
| 2002/0120935 A1 | 8/2002 | Huber |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143626 A1 | 10/2002 | Voltmer |
| 2002/0143647 A1 | 10/2002 | Headings |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0180805 A1 | 12/2002 | Chickering |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | Von Kohorn |
| 2003/0018613 A1 | 1/2003 | Oytac |
| 2003/0020744 A1* | 1/2003 | Ellis ............ H04H 60/31 715/723 |
| 2003/0023620 A1 | 1/2003 | Trotta |
| 2003/0028432 A1 | 2/2003 | Troyansky et al. |
| 2003/0028873 A1 | 2/2003 | Lemmons |
| 2003/0049967 A1 | 3/2003 | Narumo et al. |
| 2003/0050100 A1 | 3/2003 | Dent |
| 2003/0066091 A1 | 4/2003 | Lord |
| 2003/0067554 A1 | 4/2003 | Klarfeld |
| 2003/0092384 A1 | 5/2003 | Ross, III |
| 2003/0093792 A1 | 5/2003 | Labeeb et al. |
| 2003/0095650 A1 | 5/2003 | Mize |
| 2003/0108184 A1 | 6/2003 | Brown et al. |
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0139966 A1 | 7/2003 | Sirota |
| 2003/0148758 A1 | 8/2003 | McMullin |
| 2003/0149975 A1 | 8/2003 | Eldering et al. |
| 2003/0163345 A1 | 8/2003 | Itagaki et al. |
| 2003/0172374 A1 | 9/2003 | Vinson et al. |
| 2003/0217365 A1 | 11/2003 | Caputo |
| 2004/0015400 A1 | 1/2004 | Whymark |
| 2004/0125929 A1 | 7/2004 | Pope |
| 2004/0128191 A1 | 7/2004 | Kotzin |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0193488 A1 | 9/2004 | Khoo et al. |
| 2004/0194131 A1 | 9/2004 | Ellis et al. |
| 2004/0199575 A1 | 10/2004 | Geller |
| 2004/0215559 A1 | 10/2004 | Rebenack et al. |
| 2004/0220858 A1 | 11/2004 | Maggio |
| 2004/0248560 A1 | 12/2004 | Bedingfield et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |
| 2005/0137958 A1 | 6/2005 | Huber et al. |
| 2005/0235318 A1 | 10/2005 | Grauch |
| 2005/0239448 A1 | 10/2005 | Bayne |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0041843 A1 | 2/2006 | Billsus et al. |
| 2006/0075456 A1 | 4/2006 | Gray |
| 2006/0100963 A1 | 5/2006 | Leurs et al. |
| 2006/0101323 A1 | 5/2006 | Satyavolu |
| 2006/0106710 A1 | 5/2006 | Meek et al. |
| 2006/0161952 A1 | 7/2006 | Herz et al. |
| 2006/0168616 A1 | 7/2006 | Candelore |
| 2006/0212362 A1 | 9/2006 | Donsbach et al. |
| 2006/0253323 A1 | 11/2006 | Phan et al. |
| 2006/0253884 A1 | 11/2006 | Gray |
| 2006/0271438 A1 | 11/2006 | Shotland et al. |
| 2006/0271552 A1 | 11/2006 | McChesney et al. |
| 2006/0271961 A1 | 11/2006 | Jacoby et al. |
| 2006/0272002 A1 | 11/2006 | Wightman |
| 2006/0288367 A1 | 12/2006 | Swix |
| 2006/0293041 A1 | 12/2006 | Kim |
| 2007/0038514 A1 | 2/2007 | Patterson et al. |
| 2007/0083885 A1 | 4/2007 | Harding |
| 2007/0130581 A1 | 6/2007 | Del Sesto |
| 2007/0136753 A1* | 6/2007 | Bovenschulte ......... H04H 60/31 725/46 |
| 2007/0157225 A1 | 7/2007 | Harada |
| 2007/0226761 A1 | 9/2007 | Zalewski et al. |
| 2007/0250846 A1 | 10/2007 | Swix |
| 2007/0255622 A1 | 11/2007 | Swix |
| 2007/0288350 A1 | 12/2007 | Bykowsky |
| 2008/0004962 A1 | 1/2008 | Muthukrishnan et al. |
| 2008/0040239 A1 | 2/2008 | Jacobi et al. |
| 2008/0071594 A1 | 3/2008 | Morin |
| 2008/0104634 A1 | 5/2008 | Gajdos et al. |
| 2008/0120308 A1 | 5/2008 | Martinez |
| 2008/0147497 A1 | 6/2008 | Tischer |
| 2008/0148311 A1 | 6/2008 | Tischer |
| 2008/0154696 A1 | 6/2008 | Spiegelman et al. |
| 2008/0167943 A1 | 7/2008 | O'Neil |
| 2008/0228587 A1 | 9/2008 | Slaney et al. |
| 2008/0263586 A1 | 10/2008 | Thomas |
| 2009/0037958 A1 | 2/2009 | Traw et al. |
| 2009/0292703 A1 | 11/2009 | Matz |
| 2010/0083298 A1 | 4/2010 | Gray |
| 2010/0088725 A1 | 4/2010 | Swix |
| 2010/0191601 A1 | 7/2010 | Matz |
| 2010/0257037 A1 | 10/2010 | Matz |
| 2010/0257053 A1 | 10/2010 | Ferber et al. |
| 2013/0227611 A9 | 8/2013 | Grauch et al. |
| 2014/0089980 A1 | 3/2014 | Alexander |

FOREIGN PATENT DOCUMENTS

| | | |
|---|---|---|
| WO | WO 9222983 | 12/1992 |
| WO | WO 94 17609 | 8/1994 |
| WO | WO 96 07270 | 3/1996 |
| WO | WO 98 31114 | 7/1998 |
| WO | WO 99 04561 | 1/1999 |
| WO | WO 99 45702 | 10/1999 |
| WO | WO 99 52285 | 10/1999 |
| WO | WO 200147156 | 6/2001 |
| WO | WO 03 052551 | 6/2003 |

OTHER PUBLICATIONS

U.S. Appl. No. 08/779,306, Grauch.
U.S. Appl. No. 10/039,062, Matz.
U.S. Appl. No. 10/020,779, Swix.
www.actv.com, Screen Print, Oct. 8, 2000.
"ACTV, Inc. Offers Exclusive Preview of 'Individualized Television' at Official All-Star Café," Business Wire, Sep. 16, 1998.
"ACTV's HyperTV & 'Individualized Television' to be Powered by Sun Microsystems' JavaTV Technology," Business Wire, Apr. 21, 1999.
Whitaker, Jerry, "Interactive TV: Killer Ap or Technical Curiosity?", Broadcast Engineering, Dec. 1999.
Dickson, Glen, "Digital TV gets specifically directed," Broadcasting & Cable, Jun. 5, 2000.
Reed, David, "The future is digital," Precision Marketing, v. 13, n.51, pg. 27, Sep. 21, 2001.
Wasserman, Todd, "Mining Everyone's Business." Brandweek, Feb. 28, 2000. 19 pages.

(56) References Cited

OTHER PUBLICATIONS

Cauley, Leslie, "Microsoft, Baby Bell Form Video Alliance," *The Wall Street Journal*, Sep. 26, 1994.

"AllNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.

"Liberate Technologies—Solutions," Digital Cable Two-Way, www.solutions.liberate.com/architecture/dc2.html, (Nov. 16, 2001) p. 1 of 1.

"Liberate Technologies—Solutions," Digital Broadband Telco, www.solutions.liberate.com/architecture/db.html, (Nov. 16, 2001) p. 1 of 1.

"Liberate Technologies—Solutions," Liberate Connect Suite, www.solutions.liberate.com/products/connect_suite.html, (Nov. 16, 2001) pp. 1-2.

"Liberate Technologies—Solutions," Liberate imprint Server ™, www.solutions.liberate.com/products/imprint_server.html, (Nov. 16, 2001) p. 1 of 1.

"Liberate Technologies—Solutions," Liberate Mediacast Server™, www.solutions.liberate.com/products/mediacast_server.html, (Nov. 16, 2001) pp. 1-2.

"Spike High Performance Server Array," Mixed Signals Technologies, Inc., www.mixedsignals.com, itvinfo@mixedsignals.com (2000) p. 1.

"Power, flexibility, and control," RespondTV, www.respondtv.com/whyrespond.html (Nov. 16, 2001) pp. 1-2.

"It just clicks!," RespondTV, www.respondtv.com/inaction.html, (Nov. 16, 2001) pp. 1-2.

"The Wink System," Wink System Diagram, www.wink.com/contents/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).

Ehrmantraut et al., "The Personal Electronic Program Guide—Towards the Pre-selection of Individual TV Programs", pp. 1-8, 1996.

\* cited by examiner

| Time | | Content |
|---|---|---|
| 1:00 | :00 | NCAA Basketball |
| | :15 | NCAA Basketball, Local News Ad, Sporting Goods Ad 1, Sporting Event Ad |
| | :30 | NCAA Basketball |
| | :45 | NCAA Basketball, Automobile Ad 1 |
| 2:00 | :00 | NCAA Basketball |
| | :15 | NCAA Basketball, Sports Ad, Sports Drink Ad, Automobile Ad 2, PGA Golf Tournament |
| | :30 | DVD Movie – Science Fiction |
| | :45 | DVD Movie – Science Fiction DVD Movie |
| 3:00 | :00 | DVD Movie – Science Fiction DVD Movie |
| | :15 | DVD Movie – Science Fiction DVD Movie |
| | :30 | DVD Movie – Science Fiction DVD Movie |
| | :45 | DVD Movie – Science Fiction DVD Movie |
| 4:00 | :00 | DVD Movie – Science Fiction DVD Movie |
| | :15 | NBA Basketball, Automobile Ad 3, Credit Card Ad 1, Airline Ad 1 |
| | :30 | NBA Basketball |
| | :45 | NBA Basketball, Tourism Ad 4, Restaurant Ad, Sporting Goods Ad 2 |
| 5:00 | :00 | NBA Basketball |
| | :15 | NBA Basketball, Local Retailer Ad. Sporting Goods Ad 1 |
| | :30 | NBA Basketball |
| | :45 | NBA Basketball, Airline Ad 1, Automobile Ad 4, Credit Card Ad 2 |
| | :00 | NBA Basketball |

FIG. 5

STREAMING VIDEO

CROSS-REFERENCE TO RELATED APPLICATIONS

This application is a continuation of U.S. application Ser. No. 10/017,742 filed Dec. 14, 2001 and since issued as U.S. Pat. No. 9,967,633, and incorporated herein by reference in its entirety. This application also relates to U.S. application Ser. No. 09/496,825 filed Feb. 1, 2000 and since issued as U.S. Pat. No. 6,983,478, which is also incorporated herein by reference in its entirety.

FIELD OF THE INVENTION

The present invention generally relates to the measurement of content-access patterns. The present invention more particularly relates to the efficient and timely collection, analysis, and utilization of content-access patterns and associated behaviors.

BACKGROUND

Individuals receive information and entertainment content from a wide variety of media sources. These sources include radio, newspapers, the Internet, and television content providers.

To support the creation and distribution of content, providers must derive revenue from the content. For example, television content providers derive substantial revenues from advertising. During the broadcast of a television program, advertisements, in the form of commercials, are inserted at various time intervals. An advertiser pays the broadcaster to insert the advertisement. Internet content providers derive revenue in a similar manner. However, in the case of an Internet content provider, advertisements are often provided simultaneously with other content.

The amount of money that an advertiser pays is related to the number of subscribers watching or accessing a broadcast. Conventionally, for television advertising, advertising revenue equals a rate per thousand viewers multiplied by the number of viewers estimated to be viewing a program. Web site content providers charge advertisers a fixed amount per advertising impression. Therefore, the higher the number of viewers or subscribers accessing content, the greater the revenue.

In the case of television programming, if a program is popular, the provider charges a higher advertising rate. In contrast, if a television program cannot produce at least as much revenue as it costs to produce the program, the provider will generally cancel the program. Therefore, television-programming providers are very interested in determining the popularity of specific programs.

Additional factors beyond the popularity of a program may affect the number of viewers who watch it. For example, a program scheduled adjacent to a popular program or between two popular programs may attain higher ratings than it might achieve without such opportune scheduling. A similar effect occurs on web sites. A large number of web site users may read content posted on a popular web site. However the same piece appearing on a less popular site may attract little attention. Therefore, content providers are interested in determining the interrelationships between various combinations of content and content types.

Content providers conventionally utilize various methods to evaluate the popularity of content and to evaluate the interrelationships between content. For example, a television-programming provider may implement a program of voluntary logging of television viewing by a viewer, followed by transmission and human processing to analyze the information contained in the log. In addition, a provider may utilize telephone, mail, or other types of surveys to inquire from random or selected viewers about the viewers' viewing habits and request their recollections regarding their viewing patterns. A provider may also utilize automated monitoring systems that attempt to intercept television channel choices and changes, record these events, and provide the recording to a clearinghouse or other facility for further processing.

The provider may enlist a ratings company to perform the monitoring and processing. For example, Nielsen Media Research (Nielsen Media Research, Inc., New York, N.Y.), Arbitron (Arbitron Inc., New York, N.Y.), and MeasureCast (MeasureCast, Inc., Portland, Oreg.) provide third-party monitoring and processing capability for television, radio, and Internet content.

The Nielsen Media Research (Nielsen) Ratings are perhaps the best known of the various third-party ratings services. Nielsen utilizes a variety of conventional sampling methods to determine the number of viewers watching a particular show. For example, in five thousand homes, Nielsen installs a People Meter. The People Meter records viewing patterns from television sets, cable television set-top boxes, videocassette recorders, satellite television set-top boxes, and other sources of television programming. The People Meter records what content the particular device is providing on an ongoing basis and periodically transmits this information to servers within a Nielsen facility. Nielsen combines the data uploaded from the People Meter with media content data to determine what programming and advertising a device displayed. Nielsen uses the combined data to provide a rating for each program and advertisement. In conjunction with the People Meter, Nielsen also utilizes viewer diaries and surveys to gather information from a broader spectrum of television viewers and to confirm the results generated by the People Meter.

Arbitron Inc. (Arbitron) is well known for providing radio broadcast ratings. Arbitron compiles ratings by utilizing surveys. Arbitron also provides television ratings based on various sampling techniques. In cooperation with Nielsen, Arbitron has developed a Portable People Meter to measure television ratings. The Portable People Meter is a pager-sized device, worn by a participant in a survey. The Portable People Meter records viewing by recording sounds encoded into each broadcast, which identify the program or advertisement. The survey participant periodically plugs the Portable People Meter into a recharger, which also includes a communicator that uploads the data in the Portable People Meter into a remote Arbitron server. The Portable People Meter may be a more accurate method of television ratings than a set-top box, such as the set-top box used by Nielsen. The Portable People Meter offers the advantage of capturing viewing outside of the home and of recognizing when the viewer is not within audible range of a television, and therefore, less likely to be viewing a particular program or advertisement.

As the use of the Internet increases, the distribution of programming via Internet channels becomes more important. MeasureCast, Inc. (MeasureCast) provides a ratings system for Internet media streaming. MeasureCast records the number of streams requested from a streaming server and provides reports to programming providers and advertisers detailing the popularity of particular streams. As is the case in traditional broadcast media, the more popular the stream, the higher the advertising rate a broadcaster is able to charge.

Nielsen, Arbitron, and MeasureCast provide direct methods of measuring the popularity of a program. Various indirect methods are also used to determine the popularity of programming and the effectiveness of advertising. For example, advertising effectiveness is often measured in terms of viewer attitudes and subsequent viewer actions, such as purchases, inquiries, behavior changes, and other actions. Method of obtaining these indirect measures include: focus group tests, post-advertising surveys questioning whether an advertisement was viewed, remembered and possible impact, and measures of product purchases or other indirect results that may indicate whether or not an advertising campaign has been successful.

Conventional methods to determine television viewer patterns and preferences are inefficient and not well suited to immediate, timely use for any content-customization applications. In addition, conventional systems, such as the Nielsen and Arbitron meters rely on small samples, which may not be representative of the target market for a particular advertiser.

Also, surveys are expensive and highly dependent on identifying individuals that may have been viewing television at the time of the advertisement. And post advertising results measurements suffer from questions of causality and external influences. Focus groups allow reasonably efficient low-volume viewer analysis, but statistical analysis requires an adequate number of participants and tightly controlled tests, a combination that may be difficult to achieve.

Conventional systems and methods lack simple, effective, and efficient means for determining content genre preferences. Conventional systems and methods also lack simple and efficient means for determining the duration of viewing patterns, especially as those patterns are affected by the genre or type of content, the time-of-day of a broadcast, and the content broadcast simultaneously with or adjacently to the content of interest.

SUMMARY

The present invention provides systems and methods for effectively and efficiently receiving, analyzing, and utilizing subscriber content-choice information. In an embodiment of the present invention, a merge processor combines subscriber-action and media-content detail to create a subscriber content-choice database. The resultant database provides a wealth of information regarding a subscriber's content-access patterns, including genre and time-of-day preferences as well as duration-of-access patterns.

The media-content database may include television, radio, Internet, and other programming and/or advertising data. The subscriber-action database includes actions a subscriber takes to access media content. For example, in one embodiment of the present invention, the subscriber-action database comprises a clickstream database. A clickstream database is common in Internet monitoring applications and similar databases have been described for tracking television subscriber actions. The clickstream database tracks individual subscriber actions, such as clicking a hyperlink on a web page or pushing a button on a television remote control.

In order to provide a database containing the subscriber's content choices, the merge processor merges data in the subscriber-action and media-content databases. To enable the merging of the data, each database includes a key data element. In one embodiment of the present invention each database includes a date-time identifier. The date-time identifier indicates on what date and at what time the subscriber action occurred or the media-content was available. For example, if a subscriber enters a number into a television set-top box at a point in time at which a provider is broadcasting a program on the selected channel, the merged data will indicate that the subscriber was accessing the broadcast program.

Other embodiments of the present invention include additional databases. For example, in order to categorize programming and advertising, in an embodiment of the present invention, a category or genre database is electronically linked to the media-content database. The category database may include category or advertisement category data. A program category database includes a list of general categories or genres, which may be assigned to programs in order to group various individual programs together. An advertisement category database performs the same function for advertisements.

The merge processor operates to assign a category to a media-content detail and create a content choice record by merging a subscriber action detail with the categorized media-content detail. An embodiment of the present invention may include a computer-readable medium comprising computer code to implement the process.

In one embodiment of the present invention, the merge processor receives a series of subscriber actions, merges the actions with media-content detail, and then attempts to correlate the actions with one another. The merge processor may also assign a category to the media-content detail and perform a probability analysis on subscriber content-choice information in order to predict future subscriber actions.

An embodiment of the present invention provides numerous advantages over conventional systems for using subscriber content-choice information in evaluating the popularity and effectiveness of content.

It is difficult and inefficient in conventional systems to determine television viewer category or genre preferences, e.g., sports, shopping, and/or other broad advertisement categories. Also, the category or genre preference may be further sub-categorized, e.g., college basketball, home theater, or other more detailed category, creating greater inefficiency in determining viewer preferences. The database resulting from the merge process in an embodiment of the present invention is useful for subscriber content-choice reporting, automated targeting of advertising, promotions, etc. based upon viewer category or genre-choice preferences.

Further, it is difficult and inefficient in conventional systems to determine whether subscribers have or tend to view the full duration of a show or only watch particular programming content genres or titles for limited periods of time. For example, a subscriber may view a program for five minutes and then switch the channel. In an embodiment of the present invention, reported duration patterns enable programmers and advertisers to establish high-value, for example, a high-probability of impression, timeframes within programs for various marketing, advertising and other purposes.

In addition, it is difficult and inefficient in conventional systems to determine the specific time-of-day viewing patterns of subscribers, including, for example, statistically significant trends for limited time viewing before weekday commutes, limited time viewing during meal hours, etc. In an embodiment of the present invention, information associated with the time of day during which customers view television will be valuable for certain day part analysis used by networks to determine high-value (e.g. high-probability of impression) timeframes within programs for various marketing, advertising and other purposes.

It is also difficult and inefficient in conventional systems to determine the viewing patterns of behaviors associated with viewer choices regarding programs prior to or following a program in question. For example, the tendency of customers to terminate sports programming which follows or precedes news programming may be valuable information for a program provider. Also, information associated with the probability of continued viewing of programming content following a specific category or genre of programming is valuable for certain day part analysis used by networks to determine high-value, e.g., high-probability of impression, timeframes within programs for various marketing, advertising and other purposes.

It is also difficult and inefficient in conventional systems to determine the viewing patterns of behaviors associated with viewer choices regarding the broad advertisement content categories occurring in groups of programming which a viewer observes. For example, it is difficult to determine the tendency of subscribers who watch sequences of consecutive programming to terminate non-sports programming when non-sports programming intervenes within a grouping of sports viewing. In an embodiment of the present invention, reports provide information for advertisers as well as program providers. For example, sorted data of successful advertising impressions for all subscribers may be combined to present a highly accurate analysis of the success of advertising impressions based upon the categories or genres or time-of-day in which the advertising was shown.

It is difficult and inefficient in conventional systems to determine whether advertising viewers continue to view an entire advertisement or "channel hop" to other programming. For example, whether subscribers view luxury car advertisements throughout the full duration of a thirty-second spot and/or whether subscribers immediately terminate the soft drink advertising spots.

And it is difficult and inefficient in conventional systems to determine whether advertising viewers have a higher or lower probability of viewing or terminating advertisements based upon the content of the directly preceding or following programs. It is also difficult and inefficient in conventional systems to determine whether advertising viewers have a higher or lower probability of viewing or terminating advertisements based upon the consistency and content of genres of programming presented in a multiple program sequence over a specified time interval preceding or subsequent to the advertisement. In an embodiment of the present invention, various standardized and customized reports provide data to address these issues.

It is also difficult and inefficient in conventional systems to determine the relative strengths of competitive advertising. In an embodiment of the present invention, specific analysis may be performed to compare advertising effectiveness against competitive advertising campaigns.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein:

FIG. 5 is a table illustrating the programming viewed by the subscriber during the period shown in FIGS. 3A, 3B, and 4 in an embodiment of the present invention.

DETAILED DESCRIPTION

Embodiments of the present invention provide systems and methods for effectively and efficiently receiving, combining, categorizing, and analyzing subscriber content access patterns, such as television viewing patterns, with local and national television programming and advertising content data. In an embodiment of the present invention, a subscriber's television viewing patterns are combined with programming and advertising media-content detail to determine the subscriber's content choices. These content choices are categorized so that the data may be analyzed at various levels and from various perspectives. In another embodiment, a subscriber's content choice is correlated with preceding and succeeding content choices to determine how various combinations of advertising and programming content affect a subscriber's content choices.

Figure 1:
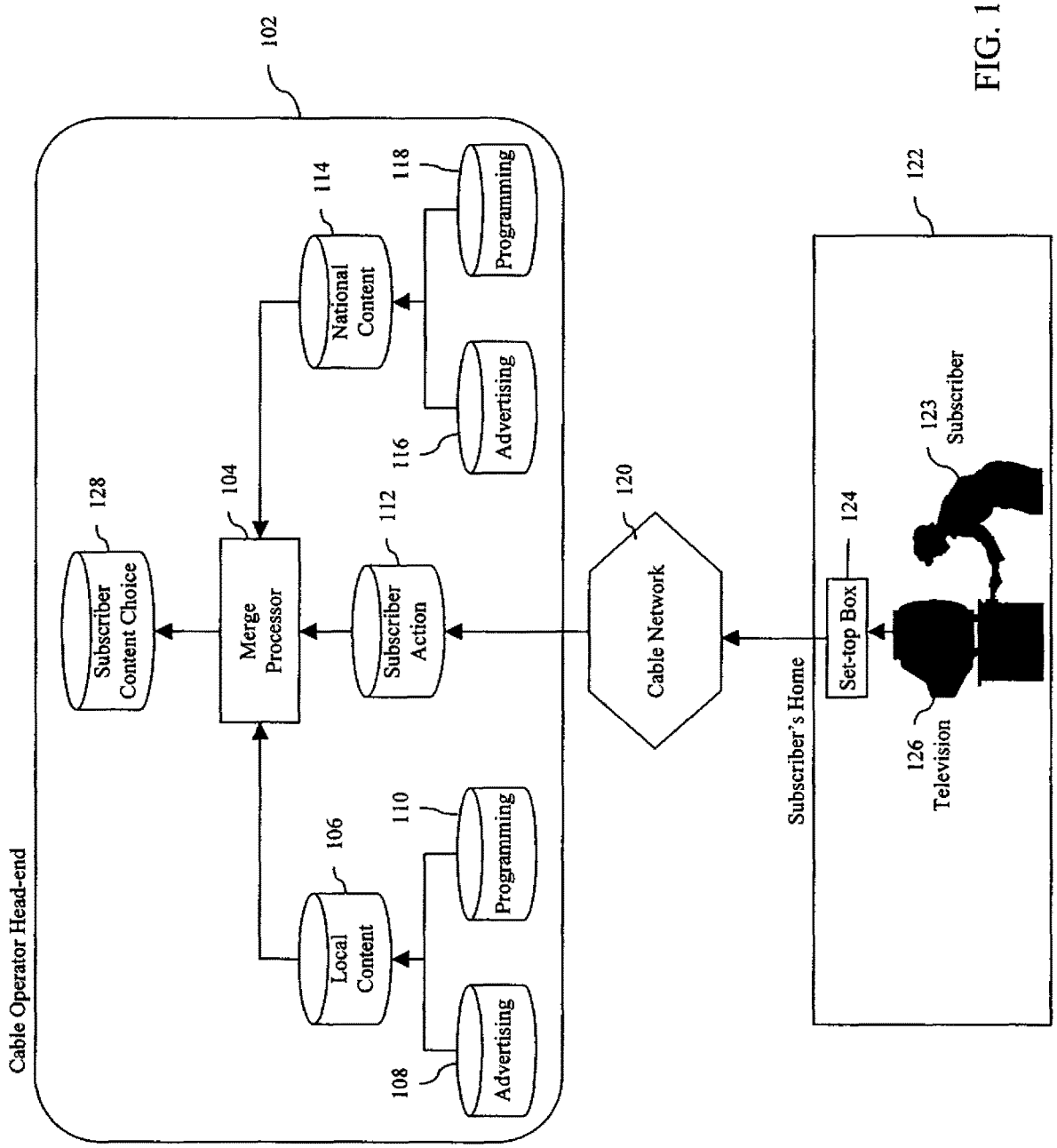
FIG. 1 is a diagram of an exemplary embodiment and an exemplary environment for operation of an embodiment of the present invention.

FIG. 1 is a block diagram illustrating an exemplary environment for an embodiment of the present invention. In the embodiment shown, a cable operator's head-end facility 102 includes a merge processor 104, which is in communication with a plurality of databases. These databases include a local-content database 106, a subscriber-action database 112, and a national-content database 114. The merge processor 104 is programmed to receive and merge data from the two databases 112, 114.

The local-content database 106 includes information from the advertising 108 and programming 110 databases. The advertising database 108 includes information related to local advertising produced and/or provided by the cable operator or other local source. Likewise, the programming database 110 includes information related to locally produced and/or provided programming. The advertising database 108 includes attributes of advertisements, such as the advertiser, producer, brand, product type, length of the content, and other descriptive information. The programming database 110 includes similar information related to programming, including the producer, type of programming, length, rating, and other descriptive information. The local-content 106, programming 108, and advertising 110 databases include a date-time identifier, which indicates when a program or advertisement has been provided. The date-time indicator provides a key value for merging various databases with one another.

In the embodiment of the present invention shown in FIG. 1, the cable operator head-end 102 also includes a national-content database 114. The national-content database 114 includes information from an advertising database 116 and a programming database 118. The information contained in each of these respective databases is similar to that contained in the local advertising 108 and programming 110 databases. However, the content is produced for a national audience and subsequently provided to the cable operator. The national-content 114, programming 118, and advertising 116 databases also include a date-time identifier.

The cable operator head-end 102 also includes a subscriber-action database 112. The subscriber-action database 112 includes the actions taken by subscribers while viewing television sets. For example, in the embodiment shown in FIG. 1, subscriber-action database 112 is in communication with cable network 120. A processor (not shown) in cable network 120 receives any subscriber actions transmitted via cable network 120 and inserts the actions as records in subscriber-action database 112. Also in communication with cable network 120 is a set-top box 124, which is installed in a subscriber's home 122. Also located in subscriber's home 122 is a television (TV) 126. As a subscriber 123 makes viewing choices on TV 126 via set-top box 124, these choices or actions are transmitted via a processor (not shown) in cable network 120 to the subscriber-action database 112.

The subscriber-action database may include a clickstream database. A clickstream database is common in Internet monitoring applications. Each time a web-browser user clicks on a link in a web page, a record of that click is stored in a conventional clickstream database. A database that includes similar information for television viewers is disclosed in a patent application filed on May 25, 2000 by Edward R. Grauch, et. al., Ser. No. 09/496,92, entitled "Method and System for Tracking Network Use," which is hereby incorporated by reference. In the database described, each action taken by a television subscriber 123, such as "channel up" and "channel down" are stored in a database with a date-time stamp to allow tracking of the television subscriber's actions.

In the embodiment shown in FIG. 1, a merge processor 104 receives information from the local-content 106, national-content 114, and subscriber-action 112 databases and merges the data based on date-time attributes of the data. For example, a detail record in the subscriber-action database 112 indicates that a subscriber's set-top box 124 was tuned to channel 12, a National Broadcasting Company (NBC) affiliate. A record in the national-content database 114 indicates that at the same point in time, NBC was broadcasting a Professional Golf Association (PGA) tournament. A record in the local-content database 106 further indicates that the cable provider preempted the PGA tournament to broadcast an infomercial for a real estate investment strategy video. The merge processor 104 receives information from each of these sources and determines that at the point in time of interest, the subscriber 123 was watching the infomercial. The merge processor stores the resultant data in the subscriber content-choice database 128. In one embodiment of the present invention, the merge processor collects information from the various databases rather than receiving it. For example, a program on the merge processor 104 includes instructions for connecting to the various databases and extracting data from each one.

In another embodiment of the present invention, subscriber content-choice database 128 includes merged information for a period of time and for a plurality of subscribers. For example, a program provider may wish to track the popularity of a program for several thousand subscribers for an entire month. Another provider may be interested in analyzing the seasonal differences in subscriber viewing behaviors.

Although in the embodiment shown in FIG. 1, the cable network is a two-way digital cable network, various other network types may also be utilized. For example, in one embodiment, subscriber's home 122 receives cable service via a digital one-way cable system. In such a system, set-top box 124 may communicate subscriber actions to subscriber-action database through a modem and telephone connection periodically. In another embodiment, subscriber 123 receives content through a digital subscriber line (DSL) from a DSL provider. In a DSL system, the set-top box 124 is able to perform two-way communications and can therefore transmit subscriber actions to subscriber-action database 112 directly.

Although in the embodiment shown, the various databases and merge processor 104 are located in the head-end facility 102, in other embodiments, the databases and merge processor 104 exist as software within the set-top box 124 or as software residing within a television network's facility (not shown). The data may be captured and analyzed by programming and advertising producers or distributors or may be utilized within a subscriber's set-top box 124 to provide advanced services tailored to the subscriber 123.

Figure 2:
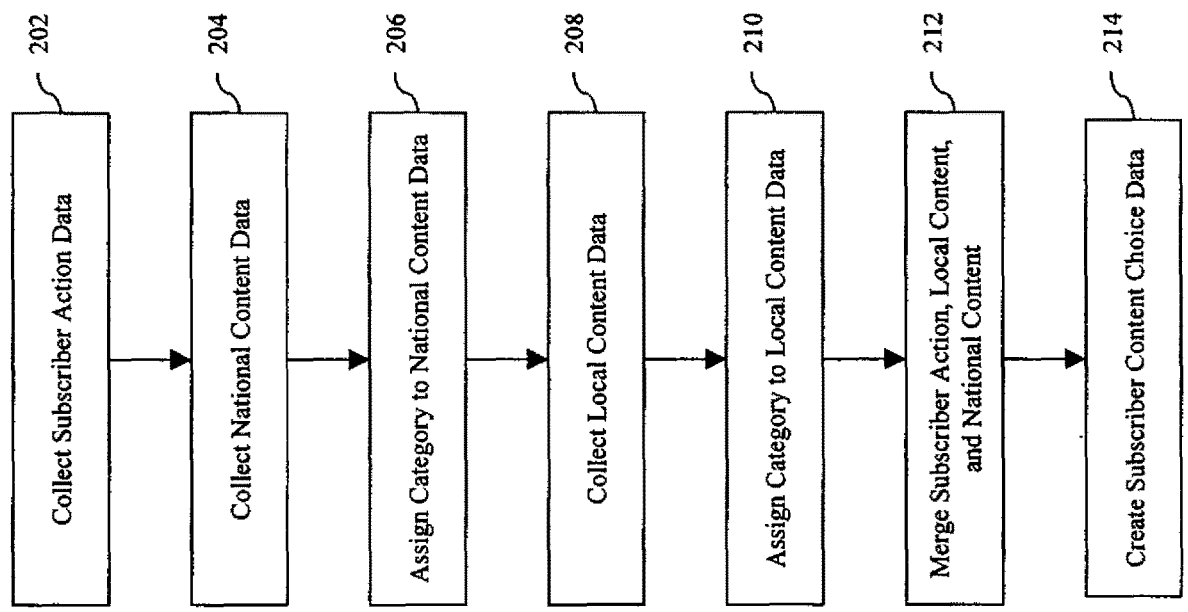
FIG. 2 is a flowchart illustrating a process implemented by a merge processor in an embodiment of the present invention.

FIG. 2 is a flowchart illustrating the general process the merge processor (104) shown in FIG. 1 implements to categorize and merge data from the various databases in an embodiment of the present invention. FIGS. 3-5 illustrate the process in greater detail.

Referring to FIG. 2, merge processor (104) receives subscriber action data from the subscriber-action database (112) 202. Subscriber action data may include data indicating that the subscriber 123 viewed an alternate data source for a period of time. For example, the subscriber 123 may view video from a VCR or DVD or other video source for a period of time. This video source supersedes both national and local-content in the subscriber content-choice database 128.

The merge processor (104) also receives data from the national-content database (114) 204. National-content data includes data describing media, such as programming and media, supplied by national providers. The merge processor (104) next assigns a category or genre to the national-content data 206. A genre is a specific type of category used in relation to artistic compositions, and genre and category are used interchangeably herein. The merge processor (104) assigns categories to content based on attributes of the content. For example, a program has a name and a creation date. The name of the program is "Wake Forest University vs. Duke University Basketball Game," and a creation date equal to the current date. The merge processor (104) uses logic in a computer program to determine that the program should be categorized as a "Live Sporting Event." The merge processor (104) may assign multiple categories to a single program, such as "Basketball," "Sports," "College-Related Programming," or some other broad descriptive term.

The merge processor also receives data from the local-content database (106) 208. The merge processor (104) then assigns a category to the local-content data 210 in a manner similar to the process of assigning a category to national-content data.

Once the merge processor has assigned a category to data in each of the content databases, the merge processor merges the categorized content data, national and local, with data from the subscriber-action database (112) 212 and creates records with the combined data in the subscriber content-choice database (128) 214. Since the content data was categorized prior to the merge process, the data in the subscriber content-choice database 214 retains the assigned categories. Therefore, data in the subscriber content-choice database 214 can be sorted, filtered, reported, and used for various other processes, which utilize groupings of the data.

The subscriber content-choice database 128 may be implemented in various ways. For example, the database 128 may simply be a number of tables in a relational database. To simplify the process of querying the data, the database may include an online analytical processing tool, such as a multidimensional database.

Figure 3A:
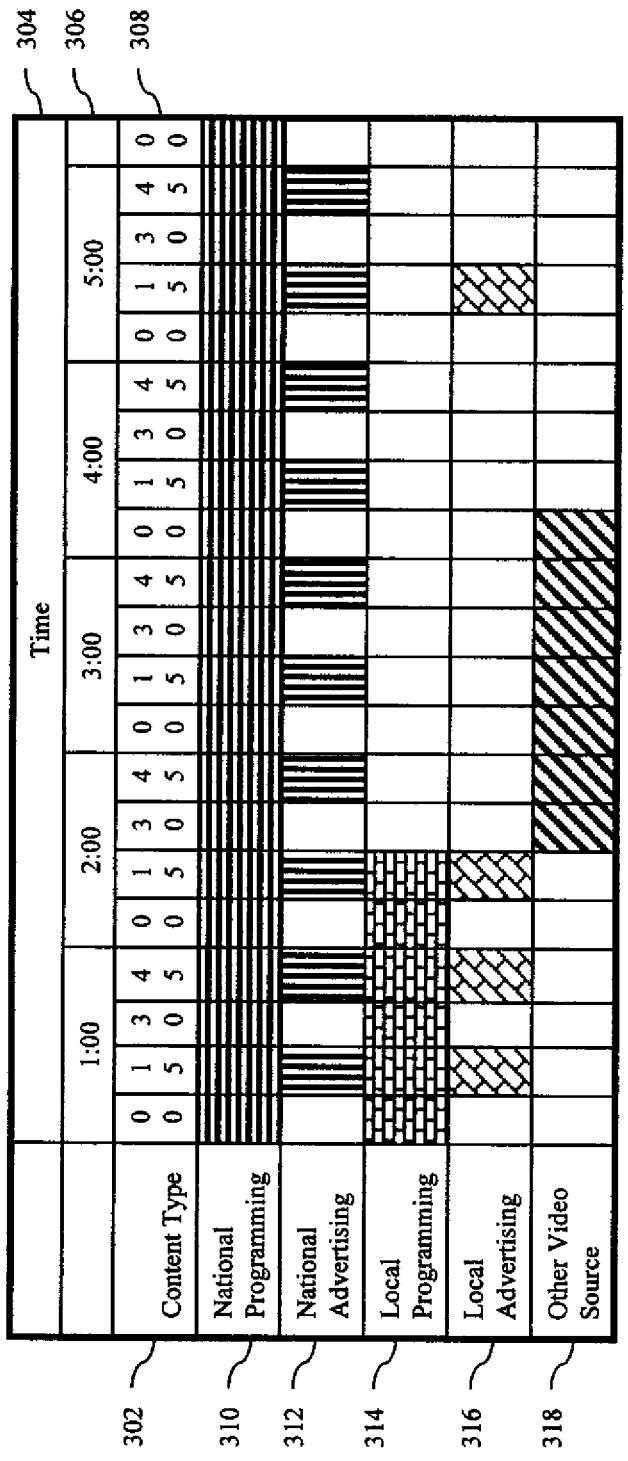
FIG. 3A is a table illustrating various sources of programming and advertising content available to a subscriber during a period of time in an embodiment of the present invention.
Figure 3B:
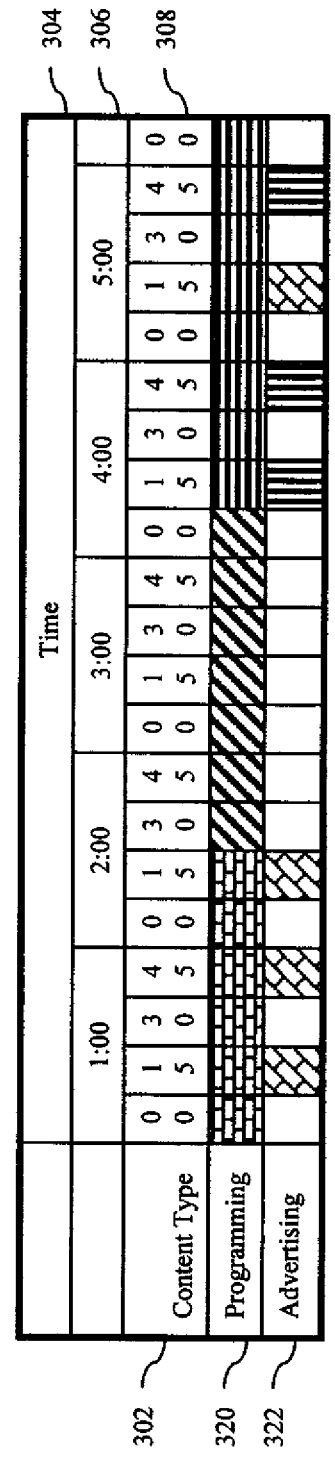
FIG. 3B illustrates content displayed on a subscriber's television during a period of time in an embodiment of the present invention.
Figure 4:
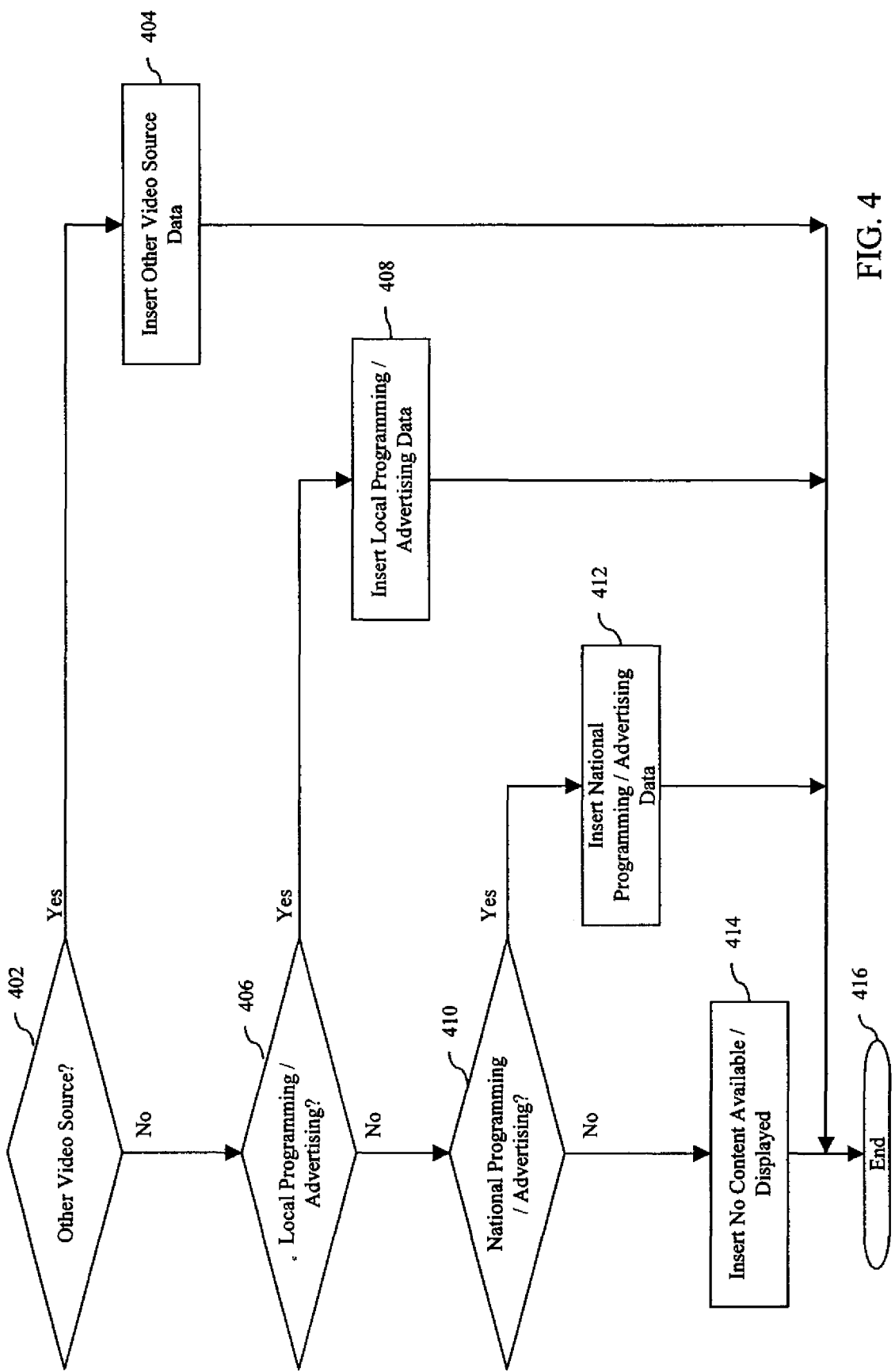
FIG. 4 is a flowchart illustrating the process of merging the data shown in FIG. 3A to create the merged data shown in FIG. 3B in an embodiment of the present invention.

FIG. 3A illustrates the sources of programming and advertising content available to the subscriber 123 while the set-top box 124 is tuned to a single channel. FIG. 3B illustrates the content displayed on the TV. FIG. 4 is a flowchart illustrating the process of merging the various content types shown in FIG. 3A to determine the content displayed on a particular channel.

FIG. 3A includes a Content Type column 302. The various content types displayed in the Content Type column 302 are shown in relation to Time 304. Time 304 in FIG. 3A is divided into hour 306 and quarter-hour 308 segments. FIG. 3A represents a simplistic scenario in which set-top box 124 is tuned to a single channel. Therefore, the Content Type 302 column includes five types of content: National Programming 310, National Advertising 312, Local Programming 314, Local Advertising 316, and Other Video Source 318. In order to present a simplified view of the available content types during the period, several content types overlap, when in reality, they would actually occur in series. For example, National Programming 310 and National Advertising 312 do not occur at the same time, but it is likely that programming and advertising both would be broadcast for at least some period of time during the fifteen minute periods of overlap shown in FIG. 3A. For example, during a television program provided by a broadcast network, a two or three-minute break occurs approximately every fifteen minutes. Therefore, a fifteen-minute period in which a three-minute break occurs will include twelve minutes of programming and three minutes of advertising.

As shown in FIG. 3A, multiple types of content may be provided during any period of time. The fact that the content is provided does not indicate that it is available on the set-top box (124) or that the subscriber 123 is viewing the content. For example, in the embodiment shown, the cable provider provided National Programming 310 continuously throughout the period. The provider provided National Advertising 312 approximately every 15 minutes during the same period. Also, the cable provider provided Local Programming 314 from 1:00 until 2:30, and Local Advertising 316 approximately every 15 minutes during that period. The cable provider subsequently provided Local Advertising 316 during the period beginning at 5:15. Also during the period shown in FIG. 3A, the subscriber 123 viewed input from the Other Video Source 318, e.g., VCR or DVD, from 2:30 until 4:15.

FIG. 4 illustrates the process for determining which programming is displayed on the subscriber's television during any specific period of time and inserting that data into the subscriber content-choice database 128 if the subscriber 123 is viewing that channel. Although various sources of content, such as a cable TV channel or a DVD movie, may be available to the subscriber (123) during any period of time, the subscriber (123) generally views only one source of programming or advertising at any one time. In addition, a content provider, such as a cable operator, makes determinations regarding which content will be available via a communications channel.

In an embodiment of the present invention, a computer program executing on merge processor (104) processes the potentially viewable data sources as a hierarchy. The program first determines, using information in the subscriber-action database (112) whether the subscriber (123) was viewing another video source, such as a VCR or DVD 402. If so, the program inserts data describing the other video source 404 into the subscriber content-choice database (128), and the process ends 416.

If the subscriber (123) was not viewing an alternate source of video and was tuned to a particular channel, then the subscriber (123) was viewing the content provided by the cable operator on that channel. To determine what content was provided by the cable provider, the program executing on the merge processor (104) determines whether the cable provider was providing local programming or advertising during the period of time 406 by accessing the local-content database (106). If so, the program inserts data describing the local programming or advertising 408 into the subscriber content-choice database (128), and the process ends. If the cable provider was not providing local programming or advertising, the program determines whether or not the provider was providing national programming or advertising 410 by accessing the national-content database (114). If so, the program inserts data describing the national programming or advertising 412 into the subscriber content-choice database (128), and the process ends 416.

If the program determines that the subscriber 123 was not viewing another video source and the provider was providing no content, the program either inserts a record in the subscriber content-choice database 128 indicating that no content was available during the specific period of time or inserts no data at all 416. For example, if TV 126 is left on after a broadcaster ends broadcasting for the rest of the day, no content is available after the broadcaster ceases broadcasting, so either a record indicating the lack of content is inserted, or no data is inserted.

It is important to note that in an embodiment of the present invention, the process illustrated in FIG. 4 is repeated for each period of time that is of interest for analyzing the data. The result of the process is a plurality of records describing a subscriber's viewing patterns during a period of time. In one embodiment of the present invention, the subscriber content-choice database (128) includes data from a plurality of subscribers as well. The databases and processor (104) in such an embodiment are configured appropriately to process the anticipated volume of data.

In the embodiment shown in FIGS. 3A and 3B, the process is repeated for each quarter hour. In other embodiments, the time period may be divided into smaller increments, such as tenth-of-a-second increments.

FIG. 3B illustrates the result of merging the data records shown in FIG. 3A using the process illustrated in FIG. 4. As in FIG. 3A, FIG. 3B is a simplistic view of this data, including the Content Type 302 and the various slices of time 304, 306, 308. In the table shown in FIG. 3B, the Content Type column 302 includes only a Programming 320 and an Advertising 322 row.

As shown in FIG. 3A, during the period from 1:00 until 2:30, the cable provider provides local programming and advertising 312, 314. The process of FIG. 4 determined that the subscriber 123 was viewing no other video source 318, and therefore, the program inserts data into the subscriber content-choice database 128 related to local programming and advertising 320, 322. During the period beginning at 2:30 and ending at 4:15, the subscriber 123 viewed video from another source 318. Therefore, the program inserts data related to the other source for this time period. During the period from 4:15 until 5:15, the provider provided national programming and advertising with the exception of the period from 5:15 until 5:30, during which local advertising was provided. The program inserts this data into the subscriber content-choice database.

FIG. 5 is a table illustrating the programming that the subscriber 123 viewed during the period shown in FIGS. 3A and 3B. As with FIGS. 3A and 3B, the table includes a Time section 502 and a Content section 504. The Time section 502 is divided into hour and quarter-hour segments.

According to FIGS. 3A and 3B, between 1:00 and 2:30, the subscriber 123 viewed local programming and advertising. By accessing the local-content database (106), the merge processor (104) determine that the local programming consisted of a NCAA (National Collegiate Athletic Association) basketball game and local advertising 506.

According to FIGS. 3A and 3B, during the period from 2:30 until 4:15, the subscriber (123) viewed a DVD 508. The merge processor (104) determines that the DVD was a science fiction DVD by extracting data from the subscriber-action database (112).

And according to FIGS. 3A and 3B, between 4:15 and 5:15, the subscriber (123) viewed national content and advertising, with the exception of the period between 5:15 and 5:30 during which the cable operator inserted a local advertisement segment in the content stream in place of the national content 510. By accessing the national-content database (114), the merge processor (104) determines that the national content viewed by the subscriber (123) was a an NBA (National Basketball Association) basketball game.

In an embodiment of the present invention, an analyst evaluates the data shown in FIG. 5 to determine preferences and viewing habits of the subscriber (123). In one embodiment of the present invention, the analyst is a computer program executing on a processor (not shown). The analyst also attempts to extrapolate the data in order to project purchase habits of the subscriber 123. In order to evaluate the data shown in FIG. 5, the analyst begins by assigning a category or genre to the programming. For example, during the period between 1:00 and 2:30, the subscriber 123 viewed a NCAA basketball game 506. An analyst would assign various types and levels of categories to the game, such as basketball, college athletics (type of program), college name, and conference. The analyst may also note that sometime between 2:15 and 2:30, a PGA golf tournament began, and the subscriber 123 started a DVD movie. This might indicate that the subscriber 123 did not enjoy watching golf on TV. During the same period, the subscriber 123 also watched several advertisements. The analyst categorizes these as well. The analyst repeats the process of categorization of programming and advertising for the remainder of the data 508, 510.

By categorizing content using multiple category types and multiple levels, the analyst is able to provide an abundance of information to programming and advertising producers, and providers, as well as to the product owners and manufacturers who pay to have the ads produced and distributed. Categorization in this manner also provides the analyst with multiple perspectives from which to analyze the data.

In addition, in an embodiment of the present invention, the analyst may look for patterns or correlations between multiple programs and advertisements or between categories of multiple programs and advertisements. In correlating data, the analyst is seeking causal, complementary, parallel, or reciprocal relations between various occurrences of data. For example, in the embodiment shown in FIG. 5, the subscriber 123 viewed a basketball game, a science fiction movie, and another basketball game. An analyst may correlate this data and find that the subscriber 123 generally watches primarily sports broadcasts, and otherwise watches content from video sources in the home. The analyst may also perform a probability analysis to determine the likelihood that a subscriber 123 will watch a particular category or genre of show if presented with the opportunity.

Although only a brief period of time is shown in the Figures, the subscriber content-choice database includes data recorded continually over many days. By analyzing various days and time periods, an analyst can determine a subscribers time-of-day viewing patterns as well as the subscriber's patterns of viewing duration. For example, an analyst may determine whether the subscriber 123 tends to view the entirety of a program or of an advertisement.

Determining the duration of viewing of advertisements is important to advertisers. If a subscriber 123 initially views an entire advertisement but subsequently, views only a small portion of the advertisement, then the advertiser may need to reschedule the advertisement so that it runs less frequently, or replace the advertisement altogether. Also, if subscribers viewing a particular category of programming generally view ads in their entirety, but other viewers do not, the advertiser may want to focus resources on presenting the advertisement to these viewers.

Beyond analyzing ads in general, advertisers may also desire information related to specific ads or even of a competitor's ads. Using the information, the advertiser may be able to determine the relative strengths and weaknesses of the advertisers own strategy versus a competitor's strategy.

In an embodiment of the present invention, various indirect methods are also used to determine the popularity of programming and the effectiveness of advertising. For example, advertising effectiveness is often measured in terms of viewer attitudes and subsequent viewer actions, such as purchases, inquiries, behavior changes, and other actions. Method of obtaining these indirect measures include: focus group tests, post-advertising surveys questioning whether an advertisement was viewed, remembered and possible impact, and measures of product purchases or other indirect results that may indicate whether or not an advertising campaign has been successful. In an embodiment of the present invention, additional databases store the data derived through these indirect methods. The merge processor 104 combines this data with the data in the subscriber content-choice database 128 to provide additional information to analysts and content providers.

An embodiment of the present invention provides great value to content providers. As a result, content providers are willing to pay for the outputs derived from the various reports and analysis. The content providers may be billed a flat subscription-type rate for access to all information received or they may pay for each report and/or analysis that they request.

An embodiment of the present invention includes a computer-readable medium, having computer-readable instructions for assigning a category and merging the subscriber-action and media-content information. Another embodiment includes computer-readable instructions for correlating multiple subscriber 123 actions occurring over a period of time.

A computer-readable medium includes an electronic, optical, magnetic, or other storage or transmission device capable of providing a processor, such as the processor in a web server, with computer-readable instructions. Examples of such media include, but are not limited to, a floppy disk, CD-ROM, magnetic disk, memory chip, or any other medium from which a computer processor can read. Also, various other forms of computer-readable media may transmit or carry instructions to a computer, including a router, private or public network, or other transmission device or channel.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A system, comprising:
    a hardware processor; and
    a memory device, the memory device storing code, the code when executed causing the hardware processor to perform operations, the operations comprising:
    receiving clickstream data via the Internet at a content provider, the clickstream data associated with a device presenting an electronic content;
    storing the clickstream data as entries in a database, the entries electronically associating the clickstream data to an identifier that uniquely identifies the device that presented the electronic content; and
    hierarchically analyzing the clickstream data received via the Internet at the content provider to determine a source of potential sources for the electronic content presented by the device.

2. The system of claim 1, wherein the operations further comprise determining an alternate video source as the source of the electronic content presented by the device.

3. The system of claim 1, wherein the operations further comprise determining a national program as the source of the electronic content presented by the device.

4. The system of claim 1, wherein the operations further comprise determining a local program as the source of the electronic content presented by the device.

5. The system of claim 1, wherein the operations further comprise determining a national advertisement as the source of the electronic content presented by the device.

6. The system of claim 1, wherein the operations further comprise determining a local advertisement as the source of the electronic content presented by the device.

7. The system of claim 1, wherein the operations further comprise determining a genre associated with the source of the electronic content presented by the device.

8. A method, comprising:
    receiving, by a server comprising a hardware processor, clickstream data via the Internet, the clickstream data sent to a content provider to describe electronic content presented by a device;
    storing, by the server, the clickstream data in an electronic database, the electronic database electronically associating the clickstream data to an identifier that uniquely identifies the device; and
    determining a source, by the server, of potential sources for the electronic content presented by the device by hierarchically analyzing the clickstream data sent to the content provider.

9. The method of claim 8, further comprising determining an alternate video source as the source of the electronic content presented by the device.

10. The method of claim 8, further comprising determining a national program as the source of the electronic content presented by the device.

11. The method of claim 8, further comprising determining a local program as the source of the electronic content presented by the device.

12. The method of claim 8, further comprising determining a national advertisement as the source of the electronic content presented by the device.

13. The method of claim 8, further comprising determining a local advertisement as the source of the electronic content presented by the device.

14. The method of claim 8, further comprising determining a genre associated with the source of the electronic content presented by the device.

15. A computer-readable memory chip storing code that when executed causes a hardware processor to perform operations, the operations comprising:
    receiving clickstream data via the Internet, the clickstream data sent to a content provider to describe electronic content presented by a device;
    storing the clickstream data in an electronic database, the electronic database electronically associating the clickstream data to an identifier that uniquely identifies the device; and
    hierarchically analyzing the clickstream data sent to the content provider to determine a source of potential sources for the electronic content presented by the device.

16. The computer-readable memory chip of claim 15, wherein the operations further comprise determining an alternate video source as the source of the electronic content presented by the device.

17. The computer-readable memory chip of claim 15, wherein the operations further comprise determining a national program as the source of the electronic content presented by the device.

18. The computer-readable memory chip of claim 15, wherein the operations further comprise determining a local program as the source of the electronic content presented by the device.

19. The computer-readable memory chip of claim 15, wherein the operations further comprise determining a national advertisement as the source of the electronic content presented by the device.

20. The computer-readable memory chip of claim 15, wherein the operations further comprise determining a local advertisement as the source of the electronic content presented by the device.

* * * * *